United States Patent [19]

Gilmour

[11] 4,280,203

[45] Jul. 21, 1981

[54] SONAR BEAM FORMING UTILIZING THE CHIRP Z-TRANSFORM

[75] Inventor: George A. Gilmour, Severna Park, Md.

[73] Assignee: Westinghouse Electric Corp., Pittsburgh, Pa.

[21] Appl. No.: 75,451

[22] Filed: Sep. 14, 1979

[51] Int. Cl.³ .............................................. G01S 15/04
[52] U.S. Cl. ..................................... 367/103; 367/121
[58] Field of Search ................ 367/103, 121, 122, 123

[56] References Cited

U.S. PATENT DOCUMENTS 3,950,723  4/1976  Gilmour .............................. 367/103

OTHER PUBLICATIONS

Jack et al., *Electronics Letters*, vol. 13, No. 3, Feb. 1977, pp. 65-66.

Primary Examiner—Richard A. Farley
Attorney, Agent, or Firm—D. Schron

[57] ABSTRACT

The chirp rate in a chirp Z-transform sonar beam former is varied as a function of range to form beams in the near field. The chirp rate may be varied with each range cell under examination or with each group of range cells.

9 Claims, 27 Drawing Figures

SONAR BEAM FORMING UTILIZING THE CHIRP Z-TRANSFORM

CROSS-REFERENCE TO RELATED APPLICATIONS

This invention is related in subject matter to copending application Ser. No. 075,488, filed concurrently herewith.

BACKGROUND OF THE INVENTION

1. Field of the Invention

The invention in general relates to the formation of sonar beams, and particularly to an arrangement utilizing CCD's and a SAW device for forming multiple beams in the near field for focusing purposes.

2. Description of the Prior Art

The chirp Z-transform is a Fourier transform technique utilized in the sonar field for forming multiple beams in the far field. The technique is used in conjunction with an elongated multi-element transducer array wherein the output signals from the elements are provided to a charge coupled device (CCD). The CCD is read out at a certain rate and is mixed with a frequency chirp signal, that is, a signal whose frequency varies linearly with time. The resultant signal is then "dechirped" in a convolver consisting of a surface acoustic wave (SAW) device, the output signal of which is detected, the detected signal constituting the multiple beam signals.

The apparatus is utilized for forming multiple beams in the far field. For many applications, however, it would be desirable to use such apparatus to focus in the near field for high resolution work. The present invention accomplishes this objective.

SUMMARY OF THE INVENTION

A chirp Z-transform sonar beam former of the present invention includes a transducer array having a plurality of active elements each operable to provide an output signal in response to received acoustic energy which is reflected from successive range increments of a target area due to previous acoustic transmissions sonifying the area.

The array output signal defines a spatial signal having a plurality of spatial frequency components each indicative of a certain receiver beam.

An encoding arrangement codes the signal by converting it to a temporal one having frequency components indicative of the receiver beams and by mixing with a frequency chirp signal. The encoding is performed and varied as a function of time to enable focusing in the near field.

A decoding arrangement separates the different frequency components to provide corresponding beam signals, for each range increment, which are then displayed.

DESCRIPTION OF THE PREFERRED EMBODIMENT

Figure 1:
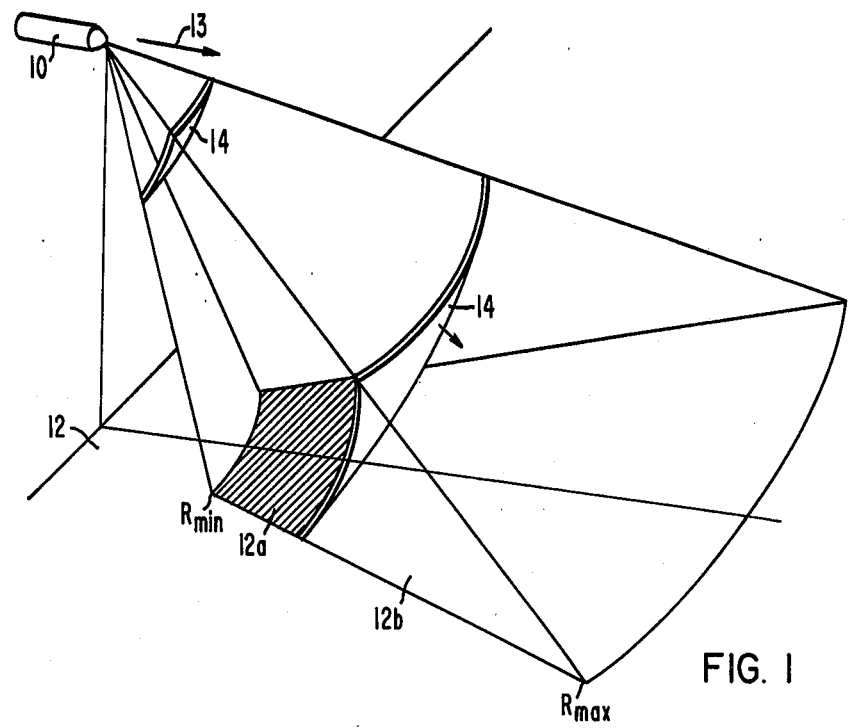
FIG. 1 illustrates a forward looking sonar operation in the transmit mode for sonifying a target area.

FIG. 1 illustrates a carrier vehicle 10 proceeding over a target area 12 in the direction of arrow 13. Sonar equipment on the carrier vehicle is operable to repetitively project pulses of acoustic energy toward the target area to sonify a portion of the target area whereby targets may be detected. FIG. 1 illustrates the pulse 14 at two stages of its travel, the latter being after impingement with the target area 12, the pulse being operable to sweep out an area from a minimum range $R_{min}$ out to a maximum range $R_{max}$. FIG. 1 illustrates the already insonified portion 12a, shown shaded, and as the pulse proceeds outwardly it will sonify the remainder 12b of the area.

Figure 2:
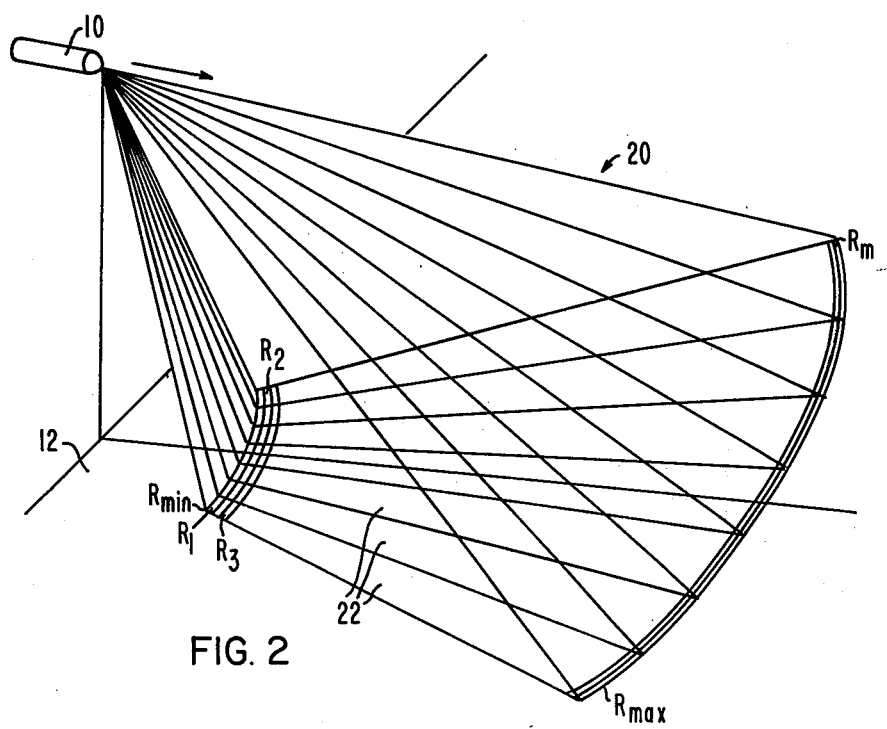
FIG. 2 illustrates the sonar in a receive mode.

The receiver portion of the sonar apparatus on board the carrier vehicle is operable to form a plurality of receiver beams 20 as illustrated in FIG. 2. With the formation of the receiver beams, adjacent elongated narrow strips 22 on the target area may be portrayed on a suitable display which will portray the returns from individual range cells $R_1, R_2, R_3 \ldots, R_M$.

Figure 3:
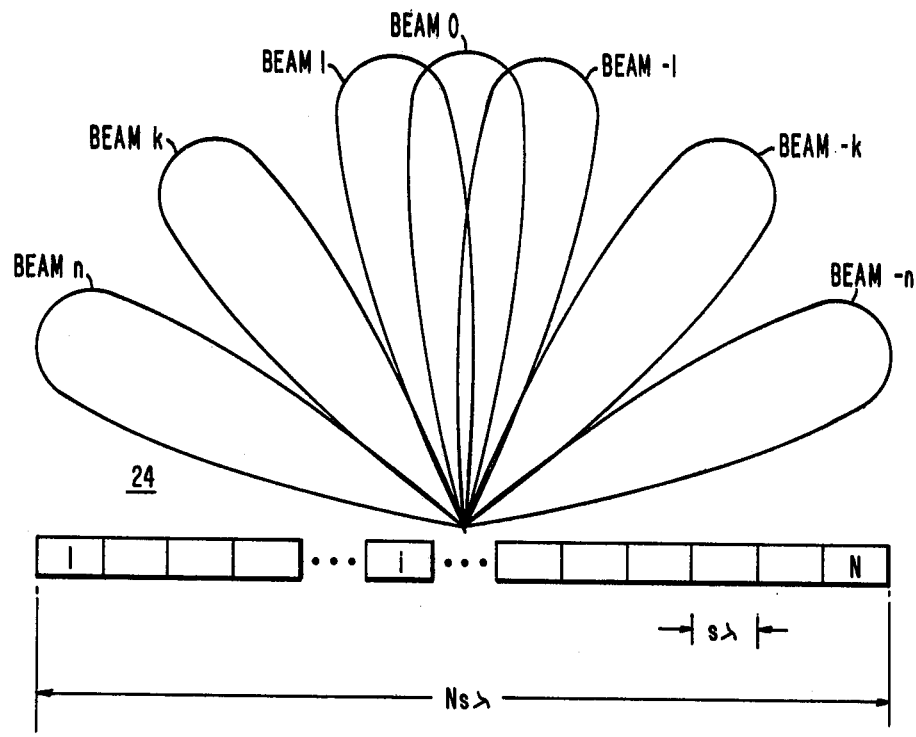
FIG. 3 illustrates a transducer array together with multiple beam formation.

A typical receiver transducer for forming multiple beams is illustrated in FIG. 3. The transducer 24 is comprised of a plurality of individual active elements 1 to N arranged end to end with each element being operable to provide an individual output signal in response to the receipt of reflected acoustic energy from the target area. A signal processing channel is connected to each individual transducer and circuitry is provided to form the multiple beams, with the center beam in FIG. 3 being designated as beam 0. Beams to one side of beam 0 are designated 1 ... k ... n, and those to the other side are designated -1 ... -k ... -n. The beams are seen to extend radially from a position on the array.

If $\lambda$ is the wavelength of the operating frequency and s is the length of an individual element, in wavelengths, then the physical length of an element will be $s\lambda$ and the physical length of the array will be $Ns\lambda$. The width of a center beam (as measured at its $-3$ dB points) is approximatey $\lambda/Ns\lambda$ radians. The beam receiving energy from an angle $\sin^{-1}(\lambda/Ns\lambda)$ is the first steered beam and the beam steered by $\sin^{-1}(2\lambda/Ns\lambda)$ is the second beam and meets the first beam at approximately the 3 dB point. In general, and to a relatively good approximation, any beam k receives energy which impinges upon the array at an angle $\sin^{-1}(k\lambda/Ns\lambda)$.

Figure 4:
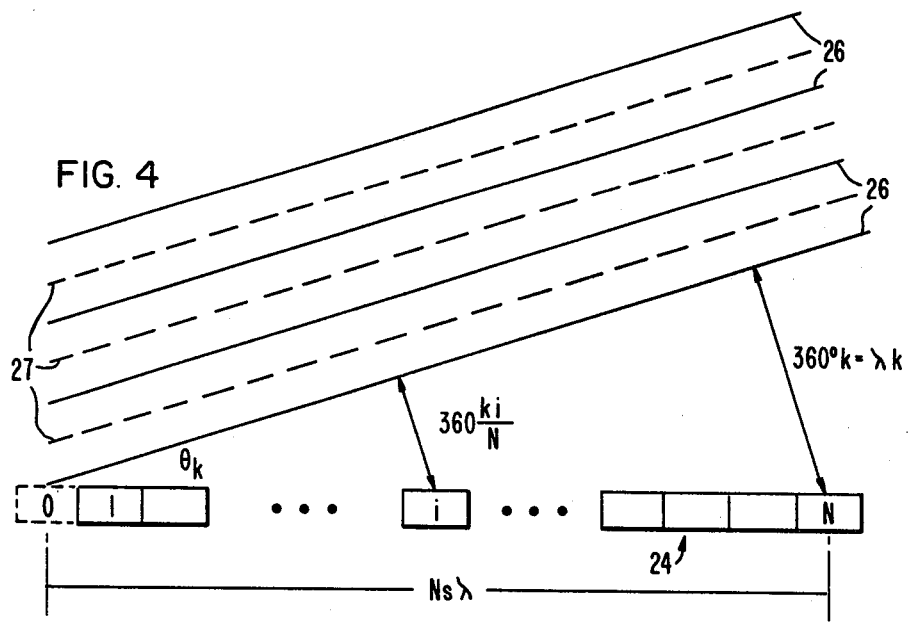
FIG. 4 illustrates the array in conjunction with impinging wave fronts to define several terms utilized herein.

For example in FIG. 4, solid lines 26 represent the crests of an impinging acoustic signal whereas the dotted lines 27 represent the troughs. The acoustic energy is emanating from the far field and accordingly the crests and troughs are illustrated as parallel straight lines.

The angle of incidence of the signal is representative of the $k^{th}$ beam for which the distance from the $N^{th}$ element to the first crest illustrated is k wavelengths or $k\lambda$. Since element N is of a discrete length, this distance is measured from the center of the element and accordingly the length $Ns\lambda$ measured from the center of element N extends beyond element 1 of the transducer array to the center of a fictitious element 0. The phase shift needed for any element i to form the $k^{th}$ beam is $360°ki/N$. The $k^{th}$ beam therefore can be represented by the summation:

$$X_k = \sum_{i=1}^{N} A_i e^{j\frac{2\pi ik}{N}} \quad (1)$$

where $A_i$ is the complex value of the output signal of the $i^{th}$ element, and wherein $2\pi$ radians has been used in place of $360°$. Equation (1) therefore illustrates that to form any beam k, the phase shift required for any element i is a constant $(2\pi/N) \times ik$. The different beam numbers k correspond to different frequencies and this concept is illustrated in FIGS. 5A through 5D, to which reference is now made.

Figure 5A:
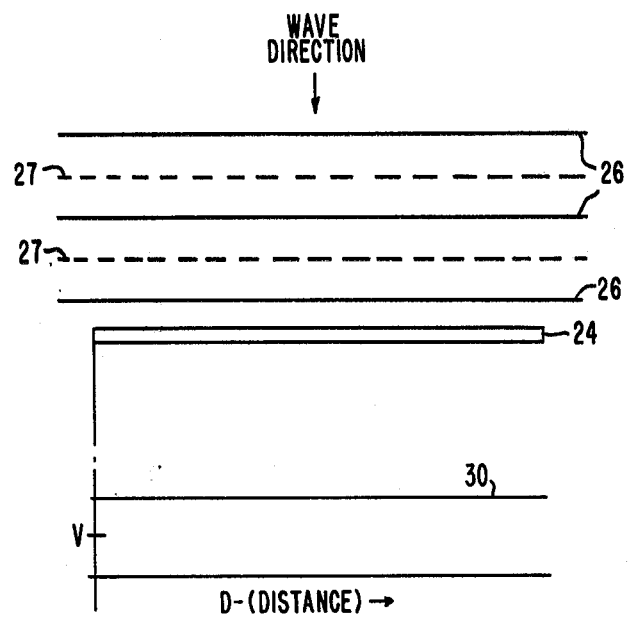
FIGS. 5A through 5D serve to illustrate the signal associated with the transducer in response to wave energy from different directions.

For the purpose of explanation, the transducer 24 in FIGS. 5A through 5D is assumed to be made up of an infinite number of infinitesimal elements. In FIG. 5A in response to the incoming acoustic signal corresponding to the beam 0 direction, every point along the transducer 24 will produce the exact some voltage at the exact same time. The spatial distribution of voltage along the length of transducer 24 is illustrated by waveform 30 which periodically increases and decreases in value in accordance with the maxima and minima of the acoustic wave signal impinging upon the transducer.

Figure 5B:
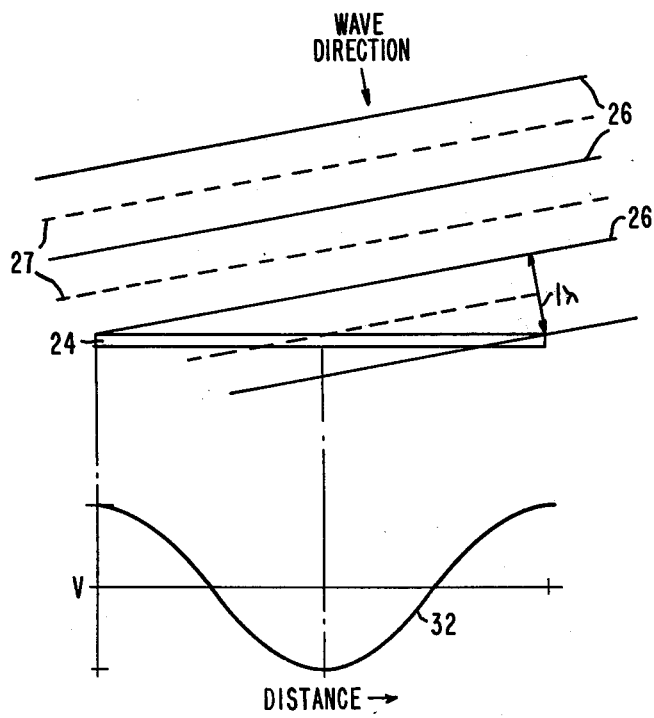

In FIG. 5B, the wave associated with beam 1 is seen to impinge on the left-hand side of transducer 24 while it is one wavelength away from the right-hand side. The two ends therefore experience maximum voltage at the same time while the center of the transducer experiences a minimum thereby resulting in the waveform 32 representing a voltage distribution as a function of linear distance, that is, a spatial waveform having associated therewith a certain spatial frequency.

Figure 5C:
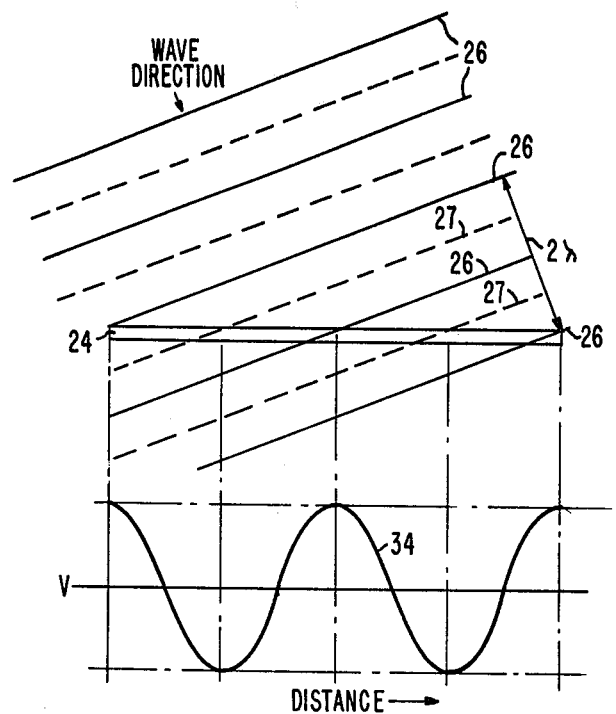
Figure 5D:
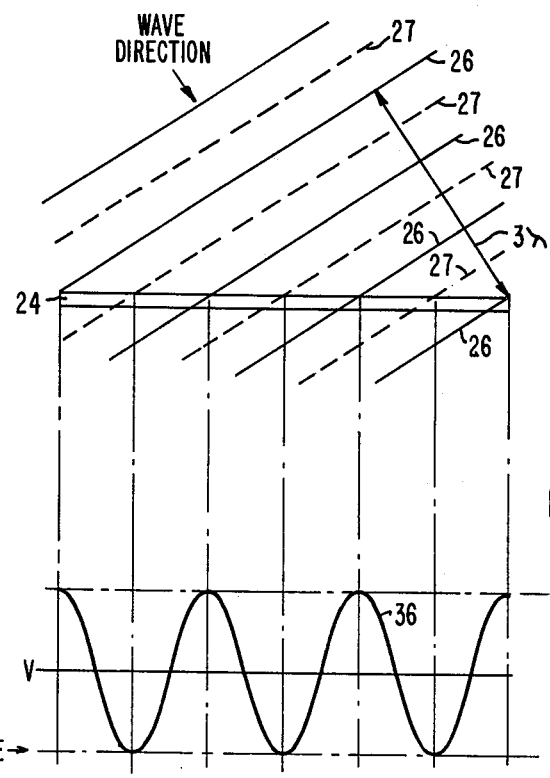

In FIG. 5C, the wave direction associated with beam 2 produces a plurality of maximum and minimum voltages along the length of the transducer 24 resulting in the waveform 34 having twice the frequency of the waveform 32. In FIG. 5D, the waveform 36 of a higher frequency than those previously shown is the result of wave energy impinging upon transducer 24 in the direction illustrated.

Accordingly, with acoustic energy impinging upon the transducer from various different directions, the spatial waveform may contain a constant term corresponding to the center beam, a fundamental spatial frequency corresponding to beam 1 as well as a plurality of harmonics each indicative of a particular beam direction. The spatial waveform may be converted to a temporal one (time varying) by the use of a storage device which is read out at a particular rate to provide the signal upon which a chirp Z-transform is performed. A typical prior art circuit for accomplishing this is illustrated in block diagram form in FIG. 6.

The wave front 38 coming in from a specific direction from the far field corresponds to a specific beam, for example beam k. In general, beam k will have a phase change from one end of the transducer array 24 to the other, of k wavelengths. The phase shift $\phi$ per element is $\phi = k/N$ wavelengths. The output signals of the individual elements of the transducer 24 are amplified in respective preamplifiers 40 and are provided to respective mixers 42. If the frequency of the in-coming signal is the sonar frequency $f_s \pm$ some Doppler shift, individual signals from the transducer elements are mixed to base band with the provision of a signal generator 44 providing the frequency $f_s$ to each individual mixer. The mixer outputs are filtered by respective low pass filters 46 and provided to sample and hold circuits 48 operable to sample and hold the individual signals upon the application of a command signal s from timing and control circuit 49.

The individual signals are loaded into a charge coupled device (CCD) 50 to be read out therefrom by means of the CCD clock 52 when so commanded by signal C from the timing and control circuit 49. During the readout time T the information from the $k^{th}$ beam will go through k cycles (e.g. see FIG. 5B—one cycle for beam 1; FIG. 5C—two cycles for beam 2; and FIG. 5D—three cycles for beam 3; in general, k cycles for beam k); that is, the data will have a frequency of k/T. Since N samples are read out in T seconds, the readout rate is N/T. If this value, N/T, is given the designation p then the data frequency k/T equals pk/N. It will be appreciated that in actual practice, the signal provided by the CCD may be a complex waveform containing many different frequencies representing various beams. The output of the CCD is then provided to the chirp Z-transform processing circuitry 60.

Before proceeding with an explanation of the operation of circuitry 60, it will be remembered from equation (1) that the phase shift required for the $i^{th}$ element of the $k^{th}$ beam is a constant times ik. In the chirp Z-transform, the substitution for ik is made as follows:

$$ik = \frac{i^2 + k^2 - (k - i)^2}{2} \quad (2)$$

An arbitrary constant a can be placed in equation (2) for scaling purposes. Thus:

$$ik = \frac{(ia)^2 + \left(\frac{k}{a}\right)^2 - \left(\frac{k}{a} - ia\right)^2}{2} \quad (3)$$

Equation () can therefore be rewritten as:

$$X_k = \sum_{i=1}^{N} A_i e^{\frac{j2\pi}{2N}(ia)^2} e^{\frac{-j2\pi}{2N}\left(\frac{k}{a} - ia\right)^2} e^{\frac{j2\pi}{2N}\left(\frac{k}{a}\right)^2} \quad (4)$$

Figure 7:
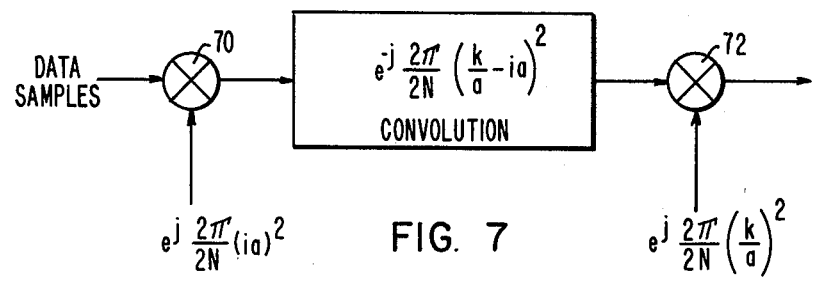
FIG. 7 serves to further illustrate the chirp Z-transform.

This can be broken into three operating steps as illustrated in FIG. 7. The first term multiplies the input data samples by a coding factor in mixer 70. The convolution term shifts the coded data such that all data for a common beam are added together. The result of the convolution is multiplied in mixer 72 with the last term to identify a specific beam k when it comes out.

The convolution is accomplished with the use of a SAW device while the first step is accomplished using a frequency chirp and the last step by utilizing a detector circuit.

A frequency chirp has the form:

$$e^{j2\pi(f_0 + \mu t)t}$$

This is equivalent to:

$$e^{j2\pi f_0 t} e^{j2\pi \mu t^2}$$

The first term is indicative of a carrier which contains no information while the second term is indicative of the chirp. In performing the chirp Z-transform operations, the following equality is made:

$$2\pi \mu t^2 = \frac{2\pi}{N} \frac{(ia)^2}{2} \quad (5)$$

Figure 6:
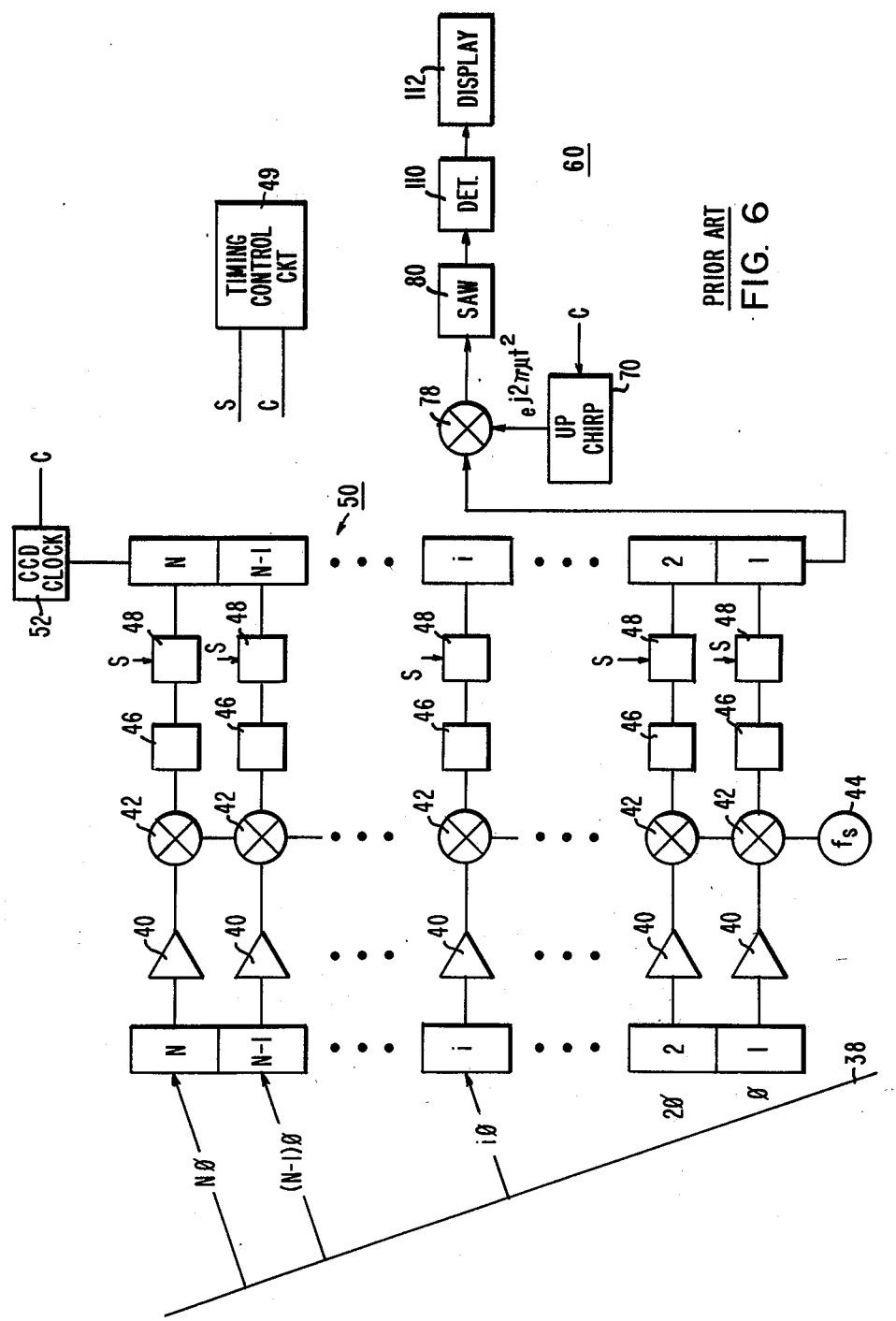
FIG. 6 is a block diagram showing one prior art system for forming multiple beams utilizing the chirp Z-transform.

In FIG. 6 the up chirp circuit 76 provides the linear frequency chirp signal $e^{2\pi \mu t^2}$. This linear FM ramp signal is mixed with the incoming data in mixer 78 so as to provide the necessary coding, and the convolution is accomplished in a SAW device 80. The operation may be explained with reference to FIGS. 8, 9 and 10.

Figure 8:
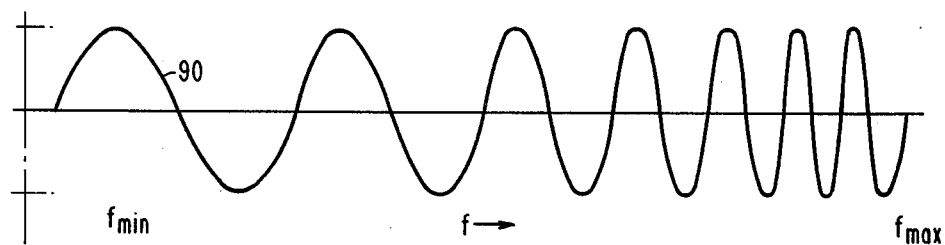
FIG. 8 illustrates a linear FM ramping signal.
Figure 9:
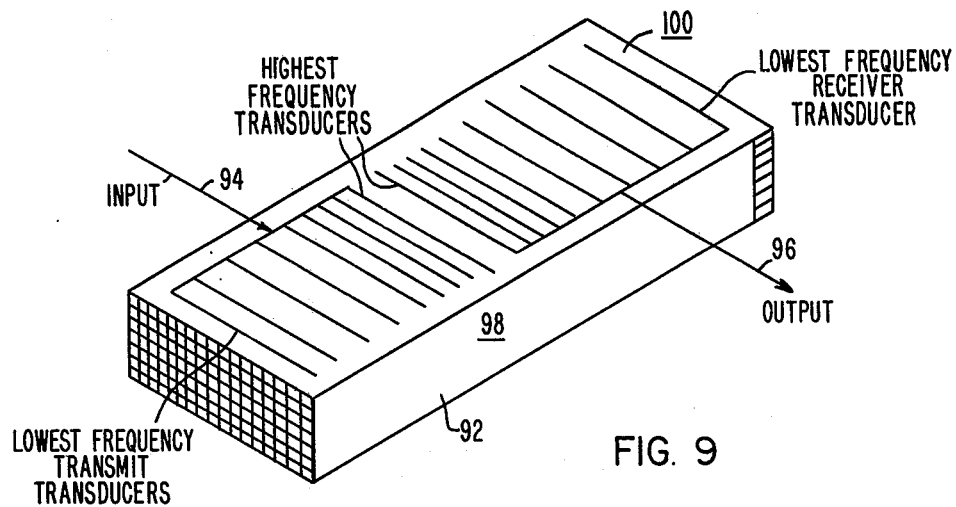
FIG. 9 is a view of a surface acoustic wave device which is utilized in the chirp Z-transform operation.
Figure 10:
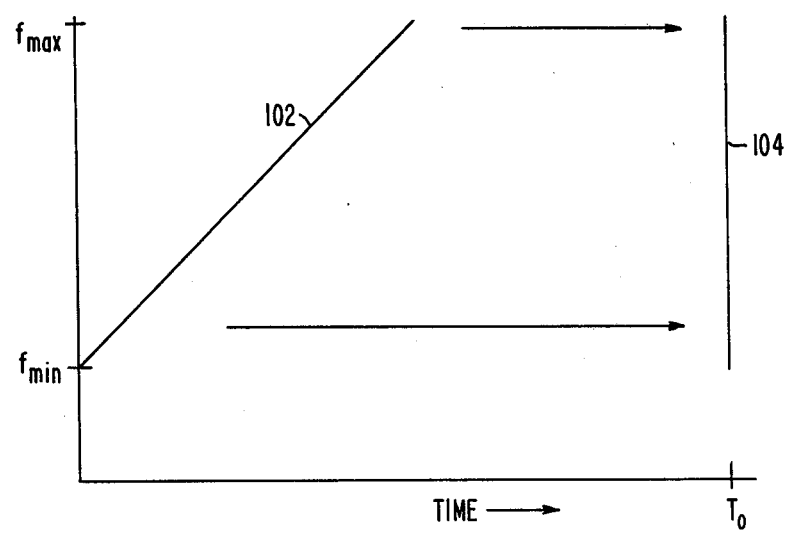
FIG. 10 is a waveform illustrating the input and the output of the device of FIG. 9.

In FIG. 8, waveform 90 is representative of a frequency chirp. The FM signal initially starts out at some minimum frequency and linearly increases in frequency to some maximum value. FIG. 9 illustrates a SAW device 92 including an input 94 and an output 96 connected respectively to a plurality of transmitting transducers 98 and a plurality of receiving transducers 100. The SAW device 92 has dispersive characteristics such that different frequencies go through it at different rates. Therefore, if the waveform 90 of FIG. 8 is applied to the input of the SAW device, the effect will be as illustrated in FIG. 10. Sloping line 102 in FIG. 10 represents the linear FM chirp ranging from a minimum frequency to a maximum frequency over a certain period of time. The lowest frequency transducers are at opposite ends of the device whereas the highest frequency transducers are contiguous near the center of the device. The lowest frequency signal has the furthest to travel and takes the longest but has a headstart relative to the higher frequencies. The distances are such that all frequencies arrive at their resonant output transducers simultaneously to provide a unitary output pulse 104 at some time $T_0$ after entry of the first frequency.

The SAW may be designed such that the reverse procedure is possible; that is, an input pulse will provide an FM frequency ramp and this may be the basis for the up chirp circuit 70 of FIG. 6. If the samples from the CCD 50 are read out at a rate of N/T=P elements per second, then i=pt. Substituting in equation (5) the chirp rate $\mu$ (the change in frequency per unit of time) will be:

$$\mu = \frac{(pa)^2}{2N} \quad (6)$$

Figure 11:
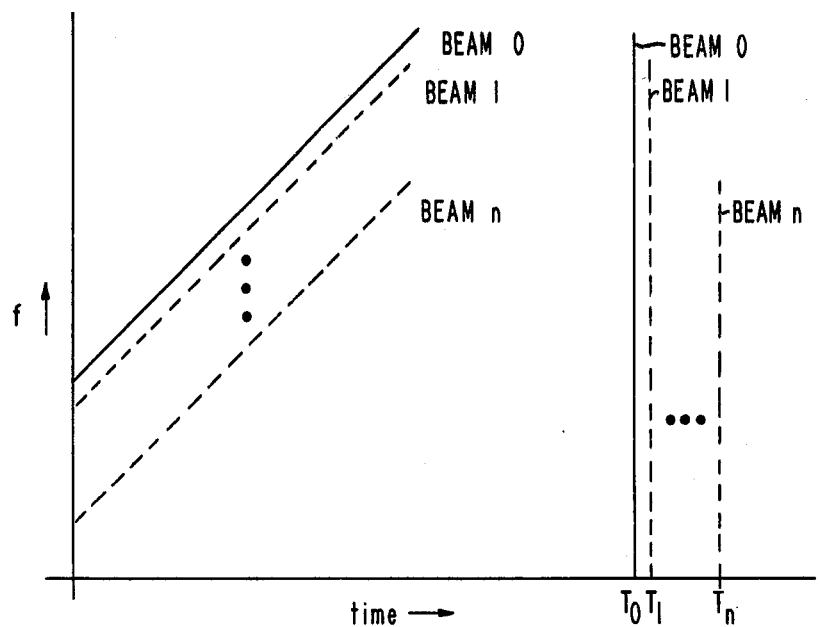
FIG. 11 is similar to FIG. 10 further illustrating the outputs of multiple beams.

As previously discussed, if acoustic energy is coming in corresponding to a particular beam, then the CCD output will contain a unique frequency indicative of that beam. The CCD output therefore may contain many different frequencies which are then mixed with the up chirp signal in mixer 78 (FIG. 6) with this modulation process providing upper and lower side band signals. The lower side band operation is illustrated in FIG. 11 wherein frequency is plotted on the vertical scale and time on the horizontal scale. Each individual frequency present in the CCD output signal is represented by a respective ramp signal in FIG. 11 due to the provision of the frequency chirp and modulation process. The wave front from beam 0 has zero phase shift and does not cause a frequency change and therefore the basic $e^{j2\pi \mu t^2}$ chirp is identified as the beam 0 ramp. The higher the beam number the lower will be the corresponding frequency chirp and the output of the SAW device will be a plurality of signals eminating at respective times $T_0, T_1 \ldots T_n$. The beam outputs follow each other by a time interval of $\Delta f/\mu$ where $\Delta f = p/N$. The output rate q therefore is:

$$q = N\mu/p \quad (7)$$

which shows that the output rate q is inversely proportional to the input rate p for a given array of N elements and selection of $\mu$.

The SAW device is a very high speed device and in order to bring its output rate down to a comparable value with the input rate, it would be desirable to make p=q. By combining equations (6) and (7), it is found that $a = \sqrt{2}$ and $\mu = p^2/N$.

Figure 12:
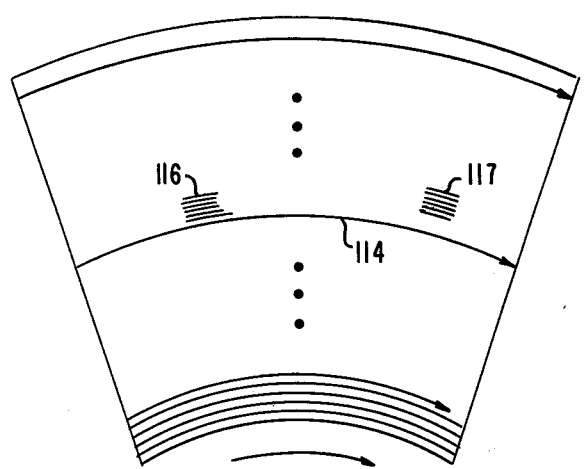
FIG. 12 illustrates a typical display for the apparatus of FIG. 6.

The signals emanating from SAW device 80 at times $T_0, T_1 \ldots T_n$ are provided to a detector 110 (FIG. 6) operable to detect the beam signals and provide them to a display 112. This display may be for example, a cathode ray tube on which is displayed a sector scan such as illustrated in FIG. 12 wherein each scan line such as scan line 114, for example, sweeps across the tube in an arc and is caused to portray a highlight corresponding to a certain beam direction if energy is received along that beam from a target. Each scan line represents one range cell of distance along the target area. Display 112 illustrates two targets highlighted during the scanning process at 116 and 117.

Figure 13:
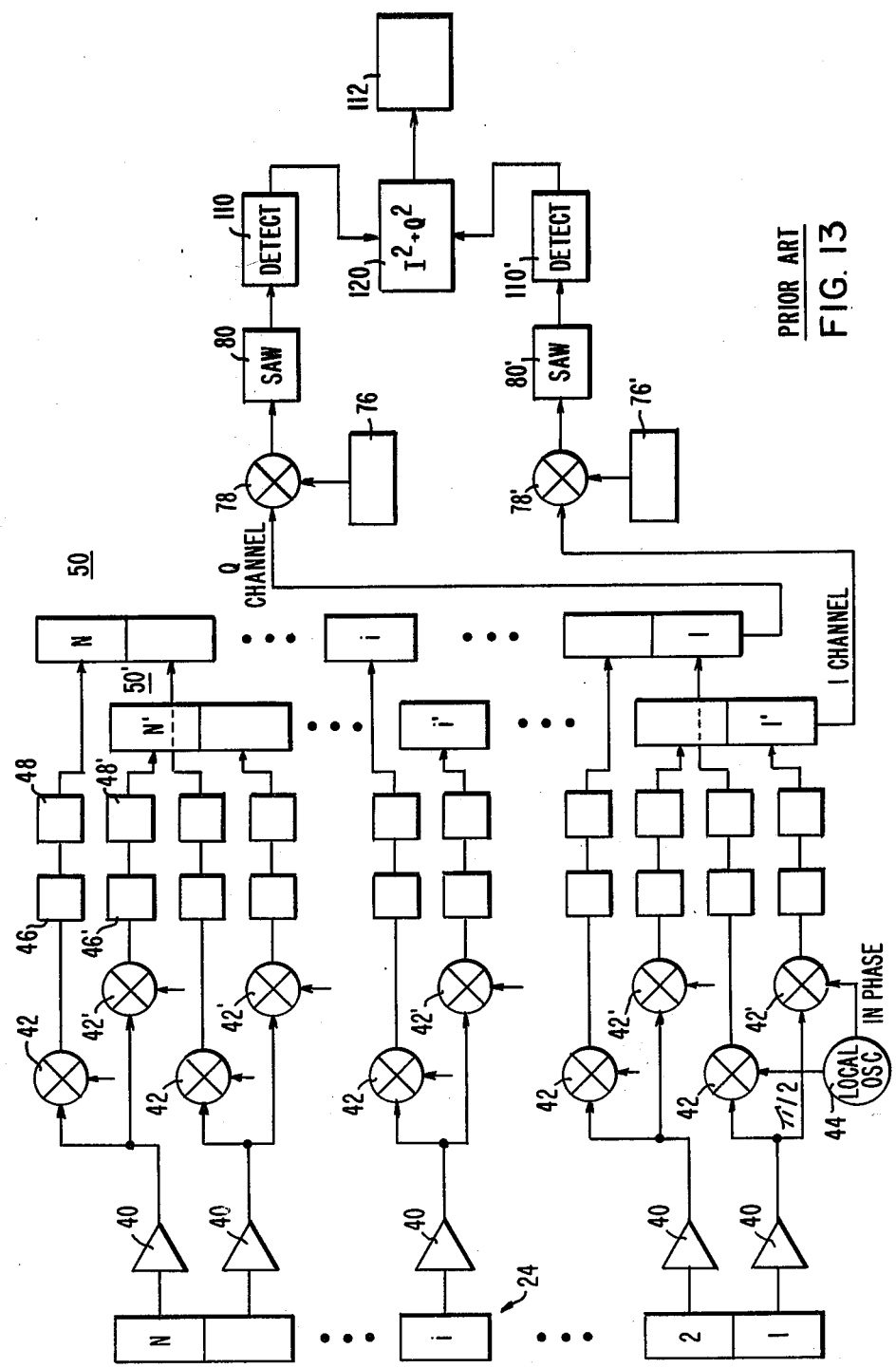
FIG. 13 illustrates another prior art arrangement similar to FIG. 6 which however eliminates certain ambiguities.

The portrayal in FIG. 11 of the linear ramps of the various frequency signals, and the resulting output signals are of the lower side band results of the mixing process. The upper side band results are not illustrated because they are not utilized in the signal detection process. In addition, for simplicity, only the treatment of the positive numbered beams has been illustrated. In actuality, beams 0 through −n will also be formed which, in the absence of selected sonification of the target area, would cause the upper side band of the positive beams to fall on top of the lower side band for the negative beams. To eliminate this ambiguity of operation, the prior art far field beam forming operation in a well known manner detects quadrature samples as illustrated in FIG. 13 wherein components for processing the quadrature phase samples have been given the same reference numerals as in FIG. 6 and components for detecting the in-phase samples have been given corresponding primed reference numerals. Thus in FIG. 13, the local oscillator 44 provides the signal $f_s$ to mixer 42 shifted in phase by $\pi/2$ relative to the signal provided to mixer 42'. CCD's 50 and 50' are loaded and read out into respective mixers 78 and 78' where the operation previously described is performed on the Q samples and the I samples. Convolutions take place in respective SAW's 80 and 80', the output signals of which are respectively detected in detectors 110 and 110'. A combining circuit 120 receives the in-phase and quadrature signals and provides a resultant to display 112 with the vector addition formed by the combining circuit 120 resolving the redundancy of the upper side band and lower side band signals such that both positive and negative beam signals may be displayed.

The prior art processing and circuitry so far described is applicable for beam forming in the far field, that is where the incoming wave fronts can be assumed to be plane waves. There are operational situations however where extremely high resolution is required and wherein the signals are often from the near field such that the wave fronts of acoustic energy which impinge upon the receiving transducer are not planar, but spherical, and the previously described prior art apparatus would not be capable of properly forming beams in the near field. The geometry of the situation is illustrated, to a grossly exaggerated degree, in FIG. 14.

Figure 14:
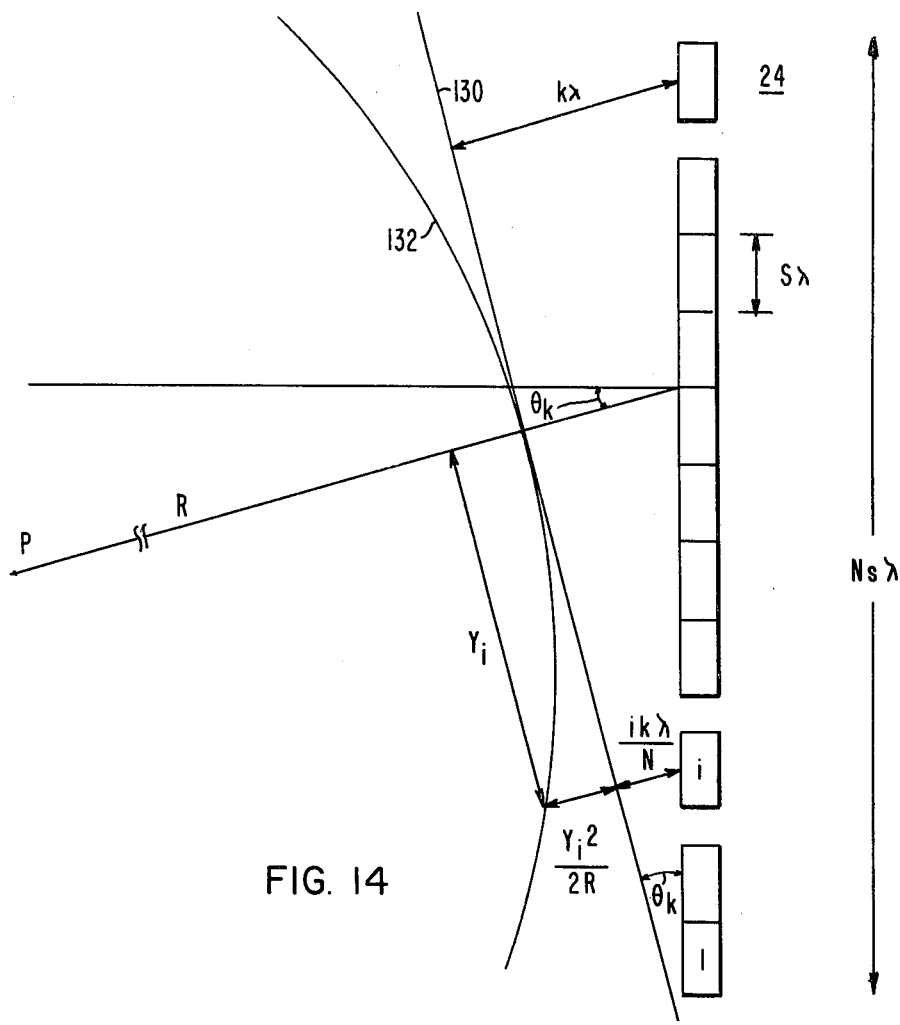
FIG. 14 illustrates a transducer array in relation to an acoustic wave eminating from the far field and the near field, and serves to define certain terms.

A planar wave front in FIG. 14 is represented by line 130 and a spherical wave front emanating from a target point P in the near field at a distance R is represented by line 132. It will be remembered that the phase shift required for any transducer element i to form the $k^{th}$ beam in the far field is $ik\lambda/N\lambda$ radians, as illustrated by the distance $ik\lambda/N$ wavelengths from element i to line 130 in FIG. 14. The distance from line 130 to line 132, which is the additional phase shift required for forming the $k^{th}$ beam in the near field is given by the approximation $Y_i^2/2R$, where $Y_i$ is the distance illustrated, and wherein the value is derived using a parabolic approximation to the circular wave front, an approximation which makes negligible error at all practical ranges of interest. It may be demonstrated that the total phase shift $\beta_i$ for any element i to focus the $k^{th}$ beam in the near field is given by the expression:

$$\beta_i = \frac{ik\lambda}{N} - \frac{Y_i^2}{2R} \quad (8)$$

where $\beta_i$ is in wavelengths.

Equation (8) may be made dimensionless by substituting $2\pi$ radians for a wavelength, $\lambda$:

$$\frac{\beta_i}{2\pi} = \frac{ik}{N} - \frac{Y_i^2}{2R\lambda} \quad (9)$$

From geometrical considerations, it may be shown that equation (9) is equivalent to:

$$\frac{\beta_i}{2\pi} = \frac{ik}{N} - \frac{i^2 s^2 \lambda}{2R}\left(1 - \frac{k^2}{N^2 s^2}\right) \quad (10)$$

If $Ns \gg k$, indicative of the central beams, then the term in parenthesis in equation (10) is approximately equal to one, so that the total phase shift $\beta_i$ is:

$$\beta_i = 2\pi\left(\frac{ik}{N} - \frac{i^2 s^2 \lambda}{2R}\right) \quad (11)$$

This approximation is also applicable for the outer beams; however, there will be some degradation in focusing which for most sonar systems would be acceptable.

The $k^{th}$ beam therefore for the near field can be represented by the summation:

$$X_k = \sum_{i=1}^{N} A_i e^{j\beta_i} \quad (12)$$

Making the substitution for $\beta_i$, equation (12) becomes:

$$X_k = \sum_{i=1}^{N} A_i e^{j2\pi\left(\frac{ik}{N} - \frac{i^2 s^2 \lambda}{2R}\right)} \quad (13)$$

Utilizing the substitution of equation (3) the expression of equation (13) becomes:

$$X_k = \sum_{i=1}^{N} A_i e^{j2\pi\left(\frac{i^2 a^2}{2N} - \frac{i^2 s^2 \lambda}{2R}\right)} e^{-\frac{j2\pi}{2N}\left(\frac{k}{a} - ia\right)^2} e^{\frac{j2\pi}{2N}\left(\frac{k}{a}\right)^2} \quad (14)$$

Figure 15:
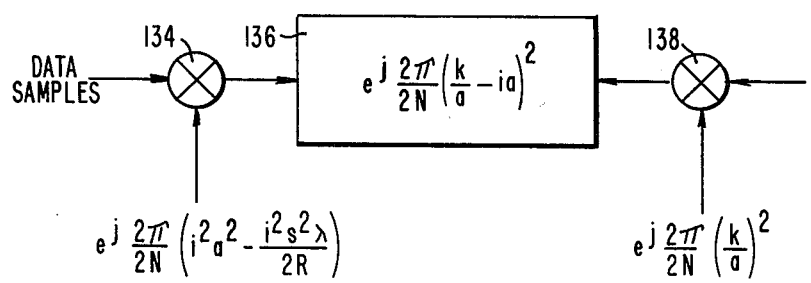
FIG. 15 is a block diagram illustrating the chirp Z-transform in accordance with the present invention.

Treating the equation in the same manner as previously done in FIG. 7, in the arrangement of FIG. 15 the data samples are multiplied in a mixer 134 which receives a signal defined by the first exponential of equation (14). The second expression is performed by a convolution in SAW device 136, the output of which is provided to mixer 138 which receives a signal indicative of the last exponential of equation (14).

The chirp rate provided to mixer 134 is different than that of the prior art. For example, if $\mu_{nf}$ is the chirp rate or frequency code required for focusing in the near field, then, in a manner similar to equation (5), $$2\pi\mu_{nf}t^2 = 2\pi\left(\frac{i^2 a^2}{2N} - \frac{i^2 s^2 \lambda}{2R}\right) \quad (15)$$

With the relationship i=pt:

$$\mu_{nf} = \frac{(pa)^2}{2N} - \frac{p^2 s^2 \lambda}{2R} \quad (16)$$

Equation (16) states that the chirp rate $\mu_{nf}$ for near field focusing is equal to the chirp rate for far field focusing (see equation 6) minus some correction factor $p^2s^2\lambda/2R$, which factor changes with range R. One embodiment of the present invention which accomplishes near field focusing of multiple beams using the chirp Z-transform is illustrated in FIGS. 16 through 19.

Figure 16:
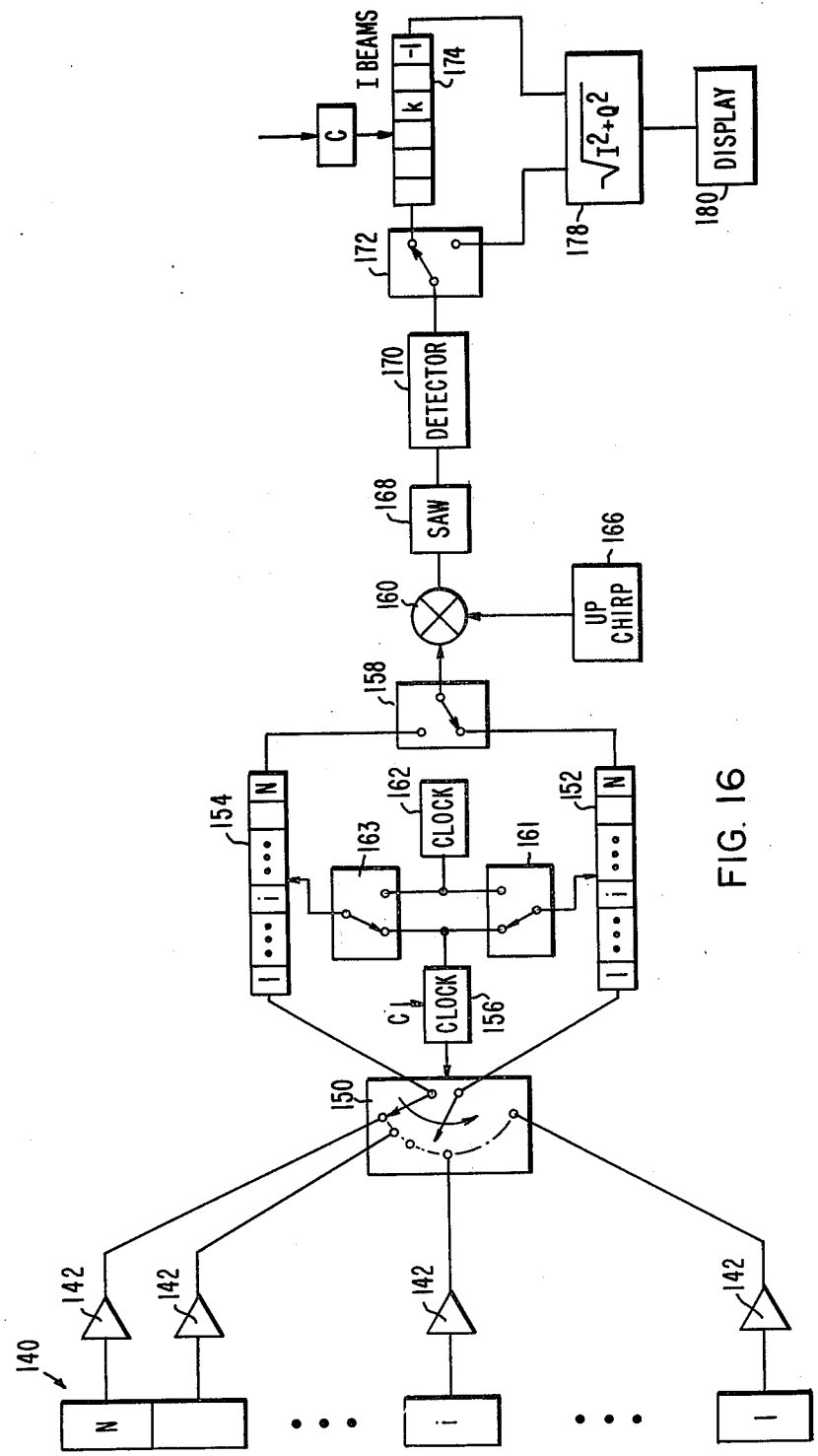
FIG. 16 is a block diagram of one embodiment of the present invention.

In FIG. 16, the transducer array 140 is provided and includes a plurality of individual transducer elements 1 ... i ... N, each element providing a respective output signal to a preamplifier 142, the output of which is scanned by an electronic scanning switch 150 illustrated functionally.

FIG. 16 illustrates yet another way of resolving beam ambiguity by using I and Q signal processing techniques. Two CCD's are provided—CCD 152 being operable to receive the I samples, and CCD 154 being operable to receive the Q samples which follow the I samples, by the scanning arrangement, by $\lambda/4c$, where c is the speed of sound in the water.

The sampled data are loaded serially into the respective CCD's, each of which contain N stages corresponding to the N elements of the transducer array, with the data being sampled and shifted along the CCD's under the control of clock 156. The clock rate for clock 156 is $f_s$, i.e., one step per cycle of the sonar frequency, $f_s$.

Electronic switch 158 is operable to first provide the I signal samples from CCD 152 to mixer 160 and thereafter to provide the Q signal samples from CCD 154. Electronic switch 161 is operable to connect read out clock 162 to CCD 152 when the I signals are read out and electronic switch 163 does the same for CCD 154 when the Q signals are read out. In accordance with the present invention, the signals are coded for near field focusing operation by means of a signal from the up chirp circuit 166 having a chirp rate as specified in equation (16), that is, a particular chirp rate modified as a function of range. The results of the mixing are provided to SAW device 168 which operates as previously described with respect to FIG. 11. Detector 170 is responsive to the output of SAW device 168 to provide the beam signals for display. After the I signal samples have been mixed, the Q signal samples go through the same process and the two beam signals, I and Q, must thereafter be combined for display purposes. To this end, there is provided electronic switch 172 which provides the I beam signals to a storage device such as CCD 174 having 2n+1 stages. After the I beam signals have been stored, they are read out and provided to combining circuit 178 along with the Q beam signals after electronic switch 172 has moved to its other position. The I and Q beam signals therefore are combined vectorially to result in beam signals for displaying on display device 180.

Figure 17:
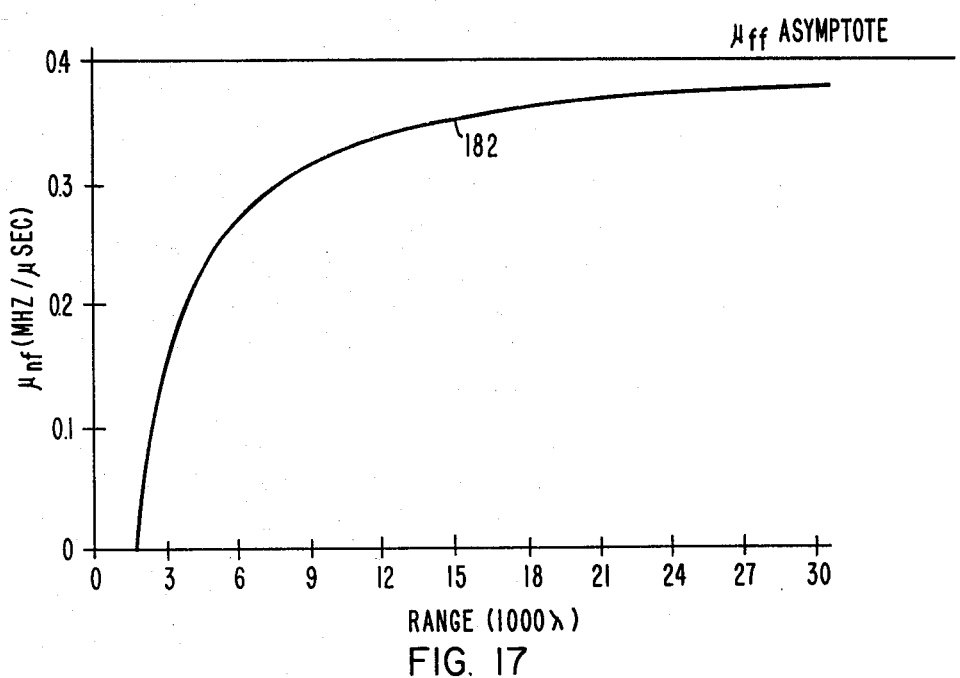
FIG. 17 is a curve illustrating the chirp rate required for near field focusing in accordance with the teachings of the present invention.

By way of example, let it be assumed that the apparatus of FIG. 16 is utilized for a forward look sonar for which the maximum range R is 30,000$\lambda$ and for which the chirp rate, if the apparatus were used in the far field, is $\mu_{ff}$=0.4 megahertz per microsecond. To use the apparatus in accordance with the teachings of the present invention for near field focusing, the chirp rate would be as illustrated in FIG. 17, wherein $\mu_{ff}$ is plotted as a horizontal line having a value of 0.4. In a forward looking sonar of this type, returns are generally displayed from about 10% of maximum range to maximum range, that is from approximately 3,000$\lambda$ to 30,000$\lambda$, the range in thousands of wavelengths being plotted on the horizontal scale of FIG. 17. Curve 182 illustrates the relationship of the chirp rate as a function of range, which would be provided by the up chirp circuit 166 of FIG. 16. In one embodiment, the chirp rate may change with each range cell which for the given example may typically be approximately 30$\lambda$ so that the curve 182 in actuality would be made up of a plurality of minute steps, undiscernible in the scale of FIG. 17. Alternatively, a particular chirp rate may be provided for a plurality of range cells, with a greater number of changes being made for the closer in range cells with the number of changes reducing for the further out range cells, that is, as curve 182 levels out.

Figure 18:
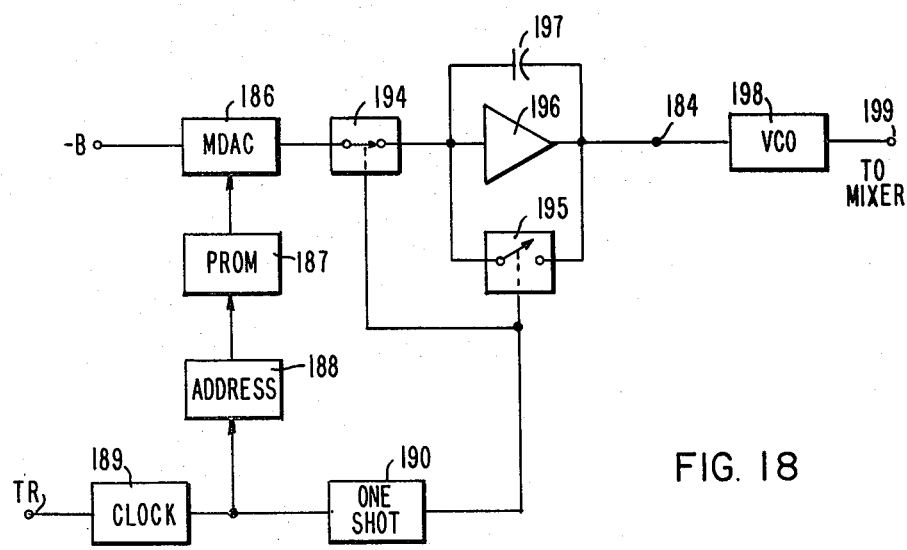
FIG. 18 is a block diagram of one embodiment of a circuit for performing the necessary functions for near field focusing.

One form of up chirp circuit 166 to accomplish the necessary coding waveform for near field focusing is illustrated in FIG. 18.

Figure 19:
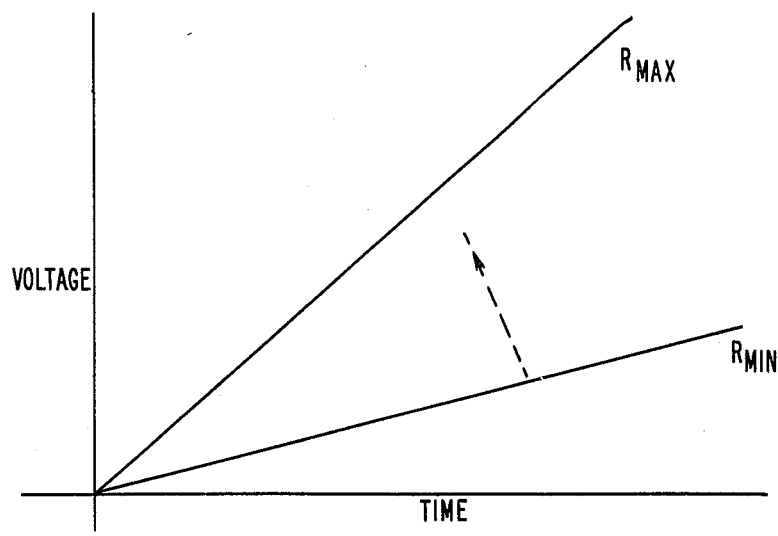
FIG. 19 illustrates the waveforms produced by the circuit of FIG. 18.

Basically, the circuit of FIG. 18 provides at output 184 a different sloped ramp signal for each range cell, or group of range cells. As illustrated in FIG. 19 it is seen that the first ramp voltage for the minimum range cell has a first slope which increases with successive range cells until a maximum for the last range cell is obtained.

To provide the different sloped ramp signals for the different range cells or range increments, the circuitry of FIG. 18 includes a multiplying digital-to-analog converter (MDAC) 186 which receives a reference voltage −B and a digital input signal from a programmable read only memory (PROM) 187, and is operable to change the input reference voltage to a current output proportional to the reference voltage times the digital word provided to it by PROM 187. Basically MDAC 186 functions as a resistor whose value changes with each range increment as commanded by PROM 187, the PROM having stored therein precalculated digital words to cause the ramp slope to correspond to the various range increments. The predetermined digital words are selected from the PROM by means of an address circuit 188 which is indexed by the output of a clock 189. Clock 189 functions to provide a pulse for each range increment and is reset in response to each acoustic transmission, by means of an input signal TR indicative of such transmission.

Each clock pulse in addition to causing the selection of a different value of resistor to be provided for each range increment additionally triggers a one-shot multivibrator 190, the output signal of which opens a first switch 194 and closes a second switch 195. Switch 195 is connected in the feedback loop of an operational amplifier 196, which also has in its feedback path a capacitor 197. The closing of switch 195 shorts out capacitor 197 around OP AMP 196 to thereby reset the OP AMP output to zero. When the one-shot multivibrator output resets, it closes switch 194 and opens switch 195 allowing the ramp voltage to commence for that particular range increment corresponding to the particular clock pulse provided. The commanded resistance of MDAC 186 for that particular range increment results in a negative current to the OP AMP 196 which operates to integrate the current (and reverse the sign) resulting in an OP AMP output at output 184 which is a positive ramp starting from zero, as illustrated in FIG. 19.

The different ramp voltages for the different range increments are utilized to vary the frequency of a voltage controlled oscillator (VCO) 198. The VCO provides at its output 199 the required chirp signals, which vary as a function of range and are provided to mixer 160 (FIG. 16).

By proper selection of the MDAC reference voltage and PROM words in conjunction with the OP AMP, the VCO output is a different chirp for each range increment as dictated by equation (16).

Figure 20:
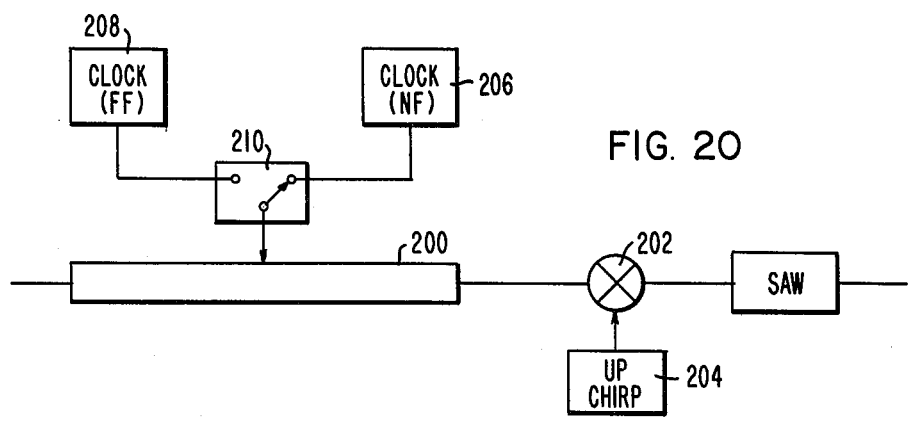
FIG. 20 is a block diagram illustrating another embodiment of the present invention.

In the embodiment of FIG. 16, the data were presented to mixer 160 at a constant rate for mixing with the coding waveform from up chirp circuit 166. Another method which accomplishes the same result as varying the chirp as a function of range is illustrated in FIG. 20. Data samples are read into a CCD 200 and outputted therefrom into a mixer 202 which receives a chirp signal from up chirp generator 204 of the type described with respect to FIG. 6 wherein the exact same linear chirp is provided for each range cell consideration.

In order to achieve near field focusing, there is provided a clock 206 for reading out the information stored in the CCD 200 at a different rate for each range increment. The provision of different readout rates may be accomplished with circuity similar to that described with respect to FIG. 18.

If the added capability of operation in the far field is desired, the apparatus may be provided with a clock 208 for reading the information out of CCD 200 in a normal manner as previously described. Selective operation may be accomplished with the provision of electronic switch 210. Although FIG. 20 illustrates one CCD, it is to be understood that for I and Q signal processing, a similar CCD could be provided receiving the same clock signals as CCD 200. Although not illustrated, a third way of accomplishing near field focusing would be to sample the output signals provided by the transducer elements at different rates for different sampling periods or groups of sampling periods. Further, although the embodiment illustrates a curved wavefront to be matched to a straight line array, the principles taught herein are equally applicable to the matching of a plane wave or a curved wave to a curved transducer array.

Figure 21:
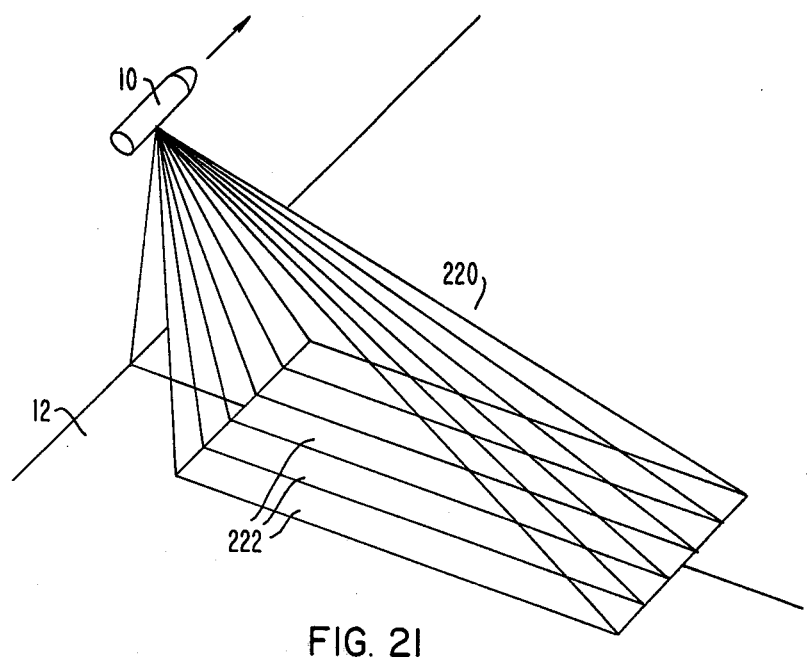
FIG. 21 is a view as in FIG. 2, however illustrating the beams formed for side looking sonar operation.

The operation thus far described relates to a forward looking sonar wherein the multiple beams formed fan out, as previously illustrated in FIGS. 2 or 3. In some cases, it may be desirable to operate the apparatus in a side looking sonar mode such as illustrated in FIG. 21 wherein the carrier vehicle 10 travelling in the direction of the arrow over the target area 12 carries apparatus which forms a plurality of receiver beams 220 which in essence are parallel to one another, to examine parallel adjacent elongated receiver strips 222 substantially laterally of the direction of travel of the apparatus. Basically, the apparatus operates as previously described in forming a plurality of fan-shaped beams; however, during the course of travel only the center beams, beams 0, are utilized. The means for accomplishing this operation is illustrated in FIGS. 22 and 23.

Figure 22:
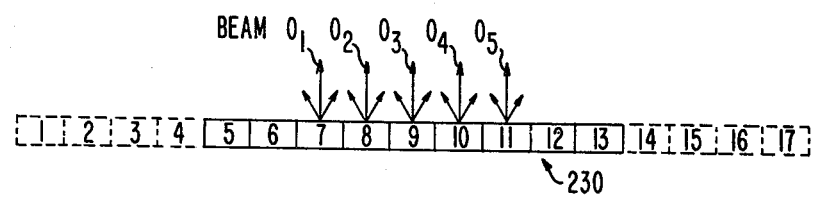
FIG. 22 is a transducer array and serves to illustrate the principles of parallel beam formation for a side looking sonar system.

FIG. 22 illustrates a transducer array 230 made up, by way of example, of nine individual active elements shown in solid lines, and labeled with the numbers 5 to 13. Elements 1 through 4 and 14 through 17, shown in dotted lines, are non-existent fictitious elements utilized in the signal processing for which case they will be considered to provide a zero amplitude signal.

By processing the output signals from a transducer of thirteen elements (with the outputs of the first four elements being zero) a set of beams is formed centered on element 7 and which fan out radially as in FIG. 2. Although a plurality of beams is formed, only the center beam, designated beam $0_1$, is selected. Thereafter, the data are recirculated for forming another set of beams opposite element 8 by considering a transducer array from elements 2 through 14, and choosing only the center beam $0_2$. The processing continues moving up one element at a time to form the last set of beams from elements 5 through 17, of which the center beam $0_5$ is chosen. Thus, the chosen center beams will form a plurality of beams, oriented parallel to one another as in FIG. 21 for side looking sonar operation. One method of accomplishing this operation is illustrated in FIG. 23.

Figure 23:
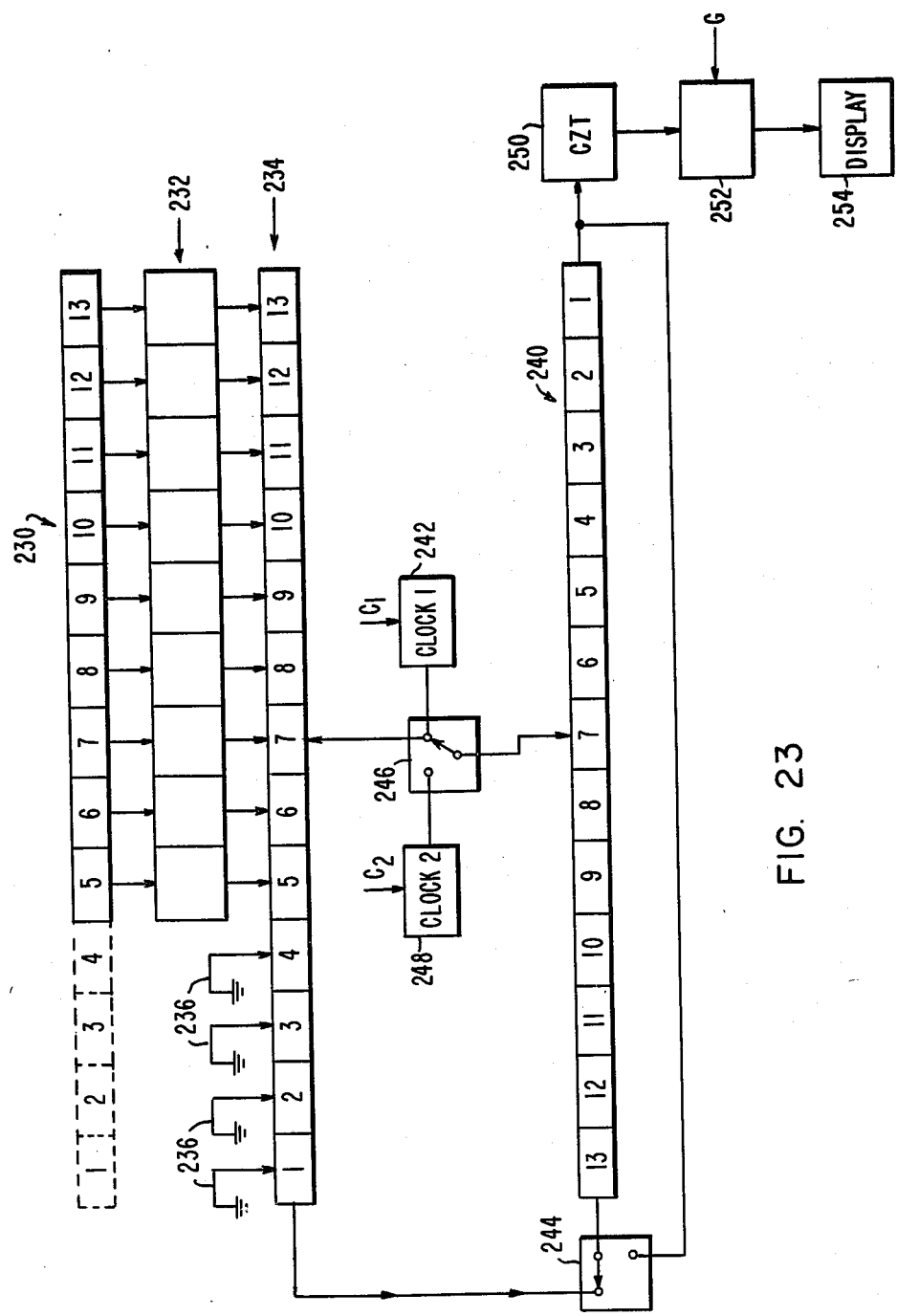
FIG. 23 is a block diagram of one embodiment of a circuit for side looking sonar operation.

In FIG. 23 transducer 230 is illustrated, however, with only the first four phantom elements 1 through 4. Real elements 5 through 13 provide their output signals to respective signal processing circuits 232 for initial preprocessing and including the elements 40 through 48 of FIG. 6. The element signals are then provided to a parallel-in/serial-out CCD 234 having thirteen stages the first four of which will receive a zero voltage input signal as a reference (since fictitious elements 1 through 4 provide no output signal) by virtue of an input connection to ground 236.

The information in CCD 234 is transferred to a serial-in/serial-out CCD 240 when these CCD's are supplied with clocking pulses from a first clock 242 receiving a clocking signal C1 from a master timing and control circuit (not shown). The data in CCD 234 are transferred through electronic switch 244 to the CCD 240 such that information previously in the left-most stage of CCD 234 occupies the right-most stage of CCD 240. After the data are loaded into CCD 240 electronic switch 246 is activated to its second position and CCD 240 receives clocking pulses from a second clock 248, in response to a control signal C2 from the master timing and control circuit, so as to read the stored data out for processing by the chirp Z-transform circuit 250.

When switch 246 is moved to its second position to provide these second clock signals, switch 244 also moves to its second position such that the information from the individual CCD cells not only go to the chirp Z-transform circuit 250, but are additionally placed back into CCD 240. The second clock 248 is designed to provide fourteen clocking pulses so that upon each readout of CCD 240 the information will be shifted one place to the right. Thus, the information previously in position 1 (a zero signal) after recirculation will occupy the previous position 13 while the previous information in position 2 will be transferred to position 1, etc.

During the first readout a signal G from the timing and control circuit will be provided to a gate circuit 252 so as to gate out only the center beam zero to display 254. The operation is continued such that the chirp Z-transform is performed on information from thirteen elements to obtain a center beam signal, indexing by one element each time. By the indexing process, the information from the fictitious transducer elements at the left hand side of the transducer array 230 initially are placed at the right hand side of CCD 240 and are thereafter transferred to the left hand side thereof so as to effectively assume the position of fictitious elements 14 through 17 of FIG. 22.

Figure 24:
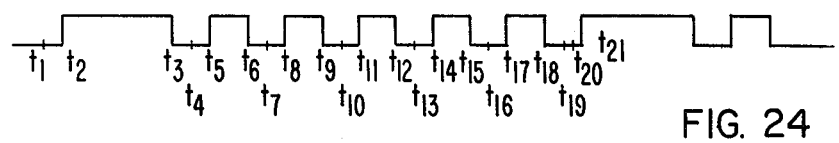
FIG. 24 is a timing diagram for the circuit of FIG. 23.

For the side looking sonar embodiment illustrated in FIG. 23 the chirp Z-transform circuit 250 can be of the type for forming beams in the near field wherein the chirp rate varies as a function of range, or for forming beams in the far field wherein the chirp rate is a constant. A timing diagram for the operation of the circuit of FIG. 23 is illustrated in FIG. 24.

For one range increment the operation is as follows:

$t_1$—the transducer element outputs are sampled and loaded into CCD 234
$t_2$—first clock 242 is started
$t_2$-$t_3$—thirteen pulses are provided from the first clock
$t_4$—switches 244 and 246 are moved to their second position
$t_5$—clock 248 is started as well as the upchirp wave form in the chirp Z-transform circuit 250
$t_5$-$T_6$—clock 248 provides fourteen output pulses
$t_7$—signal G provided to gate out first center beam
$t_8$—clock 248 and up chirp waveform again started
$t_8$-$t_9$—clock 248 provides fourteen clock pulses
$t_{10}$—second center beam signal is gated out
$t_{11}$—clock 248 and up chirp waveform again started
$t_{11}$-$t_{12}$—clock 248 provides fourteen output pulses
$t_{13}$—third center beam gated out
$t_{14}$—clock 248 and up chirp waveform once again started
$t_{14}$-$t_{15}$—clock 248 provides fourteen out pulses
$t_{16}$—fourth center beam gated out
$t_{17}$—clock 248 and up chirp waveform started
$t_{17}$-$t_{18}$—clock 248 provides fourteen output pulses
$t_{19}$—last center beam read out
$t_{20}$—switches 244 and 246 placed into the position illustrated in FIG. 23 so that the process can be repeated at $t_{21}$ for examining the very next range increment.

The process is repeated for as many range increments that are to be displayed, after which the carrier vehicle will have proceeded to a position where a subsequent transmission takes place and the entire process repeated.

As illustrated in FIG. 22, the center beams selected are perpendicular to the transducer array. In order to provide for yaw or crab angle compensation, beams other than the center beam may be selected. For example, if a slight angle is desired between the parallel beams formed and the transducer array, the provision of signal G may be varied to select for example all the beam 1's produced or beam 2's, etc.

What I claim is:

1. Sonar beam forming apparatus for receiving acoustic returns from successive range increments of a target area to be examined as a result of acoustic transmissions sonifying said area, and for forming multiple receiver beams for each said range increment, comprising:
   (A) a transducer array including a plurality of active elements each operable to provide an output signal in response to said acoustic returns, the collective output signal of said array defining a spatial signal comprised of a plurality of spatial frequency components, each spatial frequency component being indicative of a different one of said receiver beams;
   (B) encoding means for encoding said spatial signal and including means for providing a frequency chirp signal and means for converting said spatial signal to a corresponding temporal signal including a corresponding plurality of frequency components each indicative of a different one of said receiver beams, and mixing it with said frequency chirp signal to derive an encoded temporal signal;
   (C) said encoding means including means for varying said encoding as a function of said range increments;
   (D) decoding means responsive to said encoded temporal signal and operable to separate said different frequency components to provide a plurality of beam signals for each said range increment; and
   (E) means for processing and displaying said beam signals.

2. Apparatus according to claim 1 wherein:
   (A) said means for providing a frequency chirp signal provides a different rate chirp signal for each said range increment.

3. Apparatus according to claim 2 wherein:
   (A) said rate increases with successive ones of said range increments.

4. Apparatus according to claim 1 wherein said encoding means includes:
   (A) a VCO operable to receive a control signal and provide an output signal, the frequency of which is governed by said control signal; and
   (B) means for providing a ramp control signal to said VCO so as to provide an output frequency chirp signal therefrom and for varying the slope of said ramp control signal as a function of said range increments to thereby vary the frequency chirp rate as a function of said range increments.

5. Apparatus according to claim 4 wherein said means for providing said ramp control signal includes:
   (A) an integrating operational amplifier;
   (B) a circuit device of the type which is operable to receive
      (i) an input reference signal and
      (ii) digital input signals to provide output signals as a function of said digital input signals;
   (C) means for supplying said circuit device with a reference signal;
   (D) a digital memory means having a plurality of addressable storage locations for providing digital signals stored at said locations to said circuit device;
   (E) address means for addressing specific ones of said storage locations to provide specific ones of said digital signals;
   (F) means for causing said address means to select precalculated ones of said stored digital signals as a function of said range increments; and
   (G) means for providing said output signals of said circuit device to said integrating operational amplifier.

6. Apparatus according to claim 5 wherein:
   (A) said circuit device is a multiplying digital to analog converter.

7. Apparatus according to claim 1 wherein said encoding means includes:
   (A) storage means operable to receive and store the respective output signals of said active elements;
   (B) means for reading out the stored signals of said storage means, corresponding to a first range increment, at a first rate and for reading out subsequent stored signals corresponding to subsequent range increments at subsequently different rates; and
   (C) means for mixing said read out stored signals with said frequency chirp signal.

8. Apparatus according to claim 7 wherein:
   (A) the chirp rate of said frequency chirp signal is the same for each said range increment.

9. Apparatus according to claim 1 wherein:
   (A) said transducer array lies along a straight line.

* * * * *